United States Patent Office

3,836,517
Patented Sept. 17, 1974

3,836,517
WATER-INSOLUBLE DISPERSE AZO DYESTUFFS
OF CYCLIC AMINOBENZALDEHYDE ACETALS
Richard C. Wilkinson, Warwick, R.I., and Hermann Hoffmann, Charles City, Iowa, assignors to American Hoechst Corporation, Coventry, R.I.
No Drawing. Filed July 1, 1971, Ser. No. 159,064
Int. Cl. C09b 29/34, 29/36
U.S. Cl. 260—152                    2 Claims

ABSTRACT OF THE DISCLOSURE

An azo dyestuff of the formula

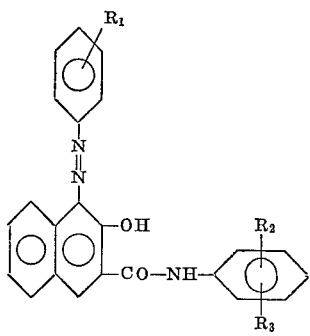

wherein $R_1$ represents a member selected from the group

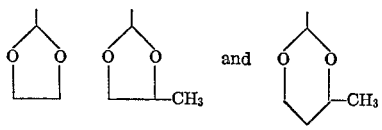

and $R_2$ and $R_3$ each represent a member selected from the group consisting of hydrogen, alkyl of 1 to 4 carbon atoms, alkoxy of 1 to 4 carbon atoms, chlorine and nitro. The azo dyestuff has improved light fastness characteristics.

---

The present invention concerns new azo dyestuffs which are especially suitable for coloring polyester materials.

It is known that azo compounds produced from anilides of 3-hydroxy-2-naphthoic acid and a variety of diazotizable anilines have found application primarily for dyeing cotton fibers. With the advent of polyester fibers, these compounds have been examined as possible disperse azo dyestuffs. As disclosed in U.S. Pat. 3,043,647, polyester fibers can be dyed with compounds prepared by coupling the 2-methoxy- and 2-ethoxy-anilides of 3-hydroxy-2-naphthoic acid and diazotized anilines substituted with at least one of the following groups: hydrogen, halogen, alkoxy, nitro, cyano, phenylamino, alkoxyphenyl amino and benzene azo. In many cases these azo compounds do not have sufficient solubility in polyester fiber material to be useful as disperse dyestuffs unless certain penetrating agents (carriers) are used. While these carriers increase the affinity of the dyestuffs to the polyester fibers, they also cause the undesirable effect of lowering the fastness to light and must be removed from the fiber after the dyeing has been completed.

From U.S. Pat. 2,481,434 it is also known that acetals such as amino-phenyl-dioxolanes and amino-phenyl-dioxanes are useful in preparing dyes for general dye purposes, such as for textiles, plastics, pigments, etc., or any application where an aldehyde group increases the fastness by reason of its reaction with a high molecular weight compound. However, most dyestuffs selected from this group have insufficient light fastness properties.

It has now been found that an azo dyestuff of the formula

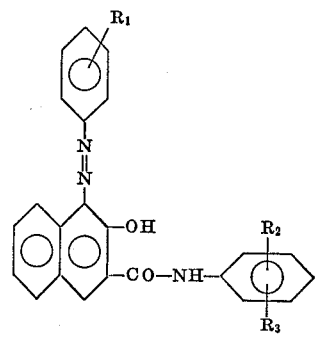

wherein $R_1$ represents a member selected from the group

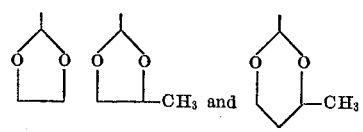

and $R_2$ and $R_3$ each represent a member selected from the group hydrogen, alkyl or alkoxy of 1 to 4 carbon atoms, chlorine and nitro, and the naphthalene ring system may be replaced by an anthracene ring system, has very valuable properties.

A dyestuff of the above formula shows very clean brilliant shades and has excellent light fastness properties. In addition, the introduction of the acetal group enhances the affinity of the azo dyestuff to polyester materials due primarily to an increase in the solubility that the acetal group imparts to the azo dyestuff molecule for polyesters.

The azo dyestuff is prepared by known techniques of azo dyestuff chemistry, i.e., by diazotizing the cyclic aminobenzaldehyde-acetal and coupling it with the anilide of 3-hydroxy-2-naphthoic acid. This procedure includes that the cyclic aminobenzaldehyde-acetal is for some time exposed to the influence of a strong acid. As it is well known that the acetals are very rapidly decomposed by acids, it is surprising that during the preparation of the claimed azo dyestuffs considerable amounts of the acetal remain unsplit. Of course, it is advisable to work very rapidly and to take care that the time during which the acetal is exposed to the influence of an acid is as short as possible. In no case should such exposure last more than 20 minutes.

Depending on the reaction time and the temperature, varying amounts of dyestuff carrying an aldehyde group are found in the final product, i.e., the substituent $R_1$ is

Normally, the dyestuff carrying an aldehyde group is present in amounts below 20% by weight, calculated on the total weight of the azo dyestuff, but in some cases up to 50% and more have been found. However, the content of dyestuff carrying an aldehyde group in the range indicated is desirable as it improves the valuable properties of the dyestuff composition.

The cyclic aminobenzaldehyde-acetal used for the preparation of the dyestuff disclosed is produced catalytically from the corresponding cyclic nitrobenzaldehyde-acetal using a method similar to that described in U.S. Pat. 2,481,434, where instead reduction is effected by nickel on kieselguhr at 400–600 p.s.i. hydrogen pressure with water as a diluent, and the products are obtained in high yield and purity.

The cyclic nitrobenzaldehyde-acetal mentioned is prepared by methods similar to those described by E. J. Salmi and K. Kyrki Suomen Kemestilekti in 19B 97–102 (1946) C.A. 41, 5480 d for nitroacetals, when the nitrobenzaldehydes are heated with a slight molar excess of the required glycol and catalytic amounts of hydrochloric acid. The removal of water during the reaction shifts the equilibrium to give a quantitative yield of almost pure cyclic nitrobenzaldehyde-acetal.

EXAMPLE 1

358 g. (2.0 mols) of 2-(3-aminophenyl)-4-methyl-1,3-dioxolane, 2 liters of water and 3 kg. of ice were mixed and stirred, while 400 ml. (4.0 mols) of concentrated hydrochloric acid (31.5%) were rapidly added during no more than 10 minutes. The pH of the dissolved mixture was kept at 1.0–2.0. To this solution was immediately added during no more than 10 minutes a solution of 151.8 g. (2.2 mols) of sodium nitrite dissolved in 500 ml. of water. The solution was tested with KI-starch paper to determine the presence of a slight excess of nitrous acid. The solution was then adjusted to a pH of 7.0, and a solution of 614 g. (2.0 mols) of 3-hydroxy-2-naphtho-o-phenetidide and 564 g. (7.0 mols) of 50 % sodium hydroxide dissolved in 4 liters of water was slowly run in during a coupling period of one hour. The pH was maintained between 7.0–8.0 during this coupling stage. The precipitated dyestuff was filtered, washed first with 2 liters of 5 percent sodium hydroxide and then finally with water until nearly neutral. The filter cake contained approximately 20–25% solid brilliant orange dyestuff and was dispersed without further drying to give the final paste.

According to the above-described procedure dyestuffs were prepared from the following coupling and azo-components:

| Example | Coupling component | Azo component | Shade |
|---|---|---|---|
| 2 | 3-hydroxy-2-napth-p-anisidide | 2-(3-amino phenyl) 1,3 dioxolane | Brill. orange. |
| 3 | 3-hydroxy-2-naphtho-o-phenetidide | do | Do. |
| 4 | 3-hydroxy-2-naphthanilide | 2-(3-aminophenyl)-4-methyl-1,3 dioxolane | Do. |
| 5 | 3-hydroxy-2-naphth-o-anisidide | do | Do. |
| 6 | 3-hydroxy-2-naphtho-o-phenetidide | do | Do. |
| 7 | 4'-chloro-3-hydroxy-2',5'-dimethoxy-2-naphthanilide | do | Red-orange. |
| 8 | 3-hydroxy-2-o-anthrotoluidide | do | Red. |
| 9 | 3-hydroxy-2-naphtho-o-toluidide | do | Brill. orange. |
| 10 | 5'-chloro-3-hydroxy-2',4'-dimethoxy-2-naphthanilide | do | Orange. |
| 11 | 3-hydroxy-2'-methyl-2-naphth-p-anisidide | do | Do. |
| 12 | 4'-chloro-3-hydroxy-2-naphtho-o-toluidide | do | Brill. orange. |
| 13 | 4'-chloro-3-hydroxy-2-naphthanilide | do | Orange. |
| 14 | 3-hydroxy-3'-nitro-2-naphthanilide | do | Brill. orange. |
| 15 | 3-hydroxy-2-naphth-o-anisidide | 2-(3-aminophenyl)-4-methyl-1,3 dioxane | Do. |
| 16 | 3-hydroxy-2-naphtho-o-phenetidide | do | Do. |
| 17 | do | 2-(2-aminophenyl)-4-methyl-1,3 dioxolane | Yellow orange. |
| 18 | do | 2-(4-aminophenyl)-4-methyl-1,3 dioxolane | Red orange. |

We claim:
1. An azo dyestuff of the formula

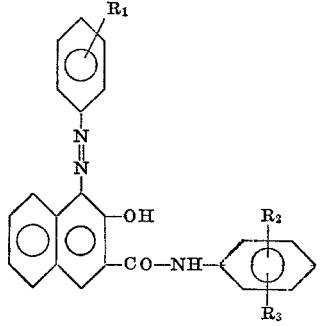

wherein $R_1$ represents a member selected from the group

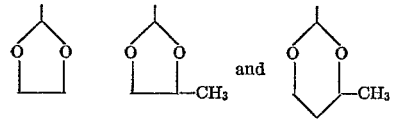

and $R_2$ and $R_3$ each represent a member selected from the group consisting of hydrogen, alkyl of 1 to 4 carbon atoms, alkoxy of 1 to 4 carbon atoms, chlorine and nitro.

2. A composition of matter consisting of (a) an azo dyestuff as claimed in Claim 1 and up to 50% by weight of the total composition of (b) an azo compound like that claimed in Claim 1 except that $R_1$ is

References Cited
UNITED STATES PATENTS

| | | | |
|---|---|---|---|
| 2,468,277 | 4/1949 | Strouse | 260—152 |
| 3,609,134 | 9/1971 | Mory | 260—152 |
| 3,043,647 | 7/1962 | Kopp et al. | 260—203 |
| 2,481,434 | 9/1949 | McQueen | 260—152 |

FLOYD D. HIGEL, Primary Examiner

R. W. RAMSUER, Assistant Examiner

U.S. Cl. X.R.
260—192, 204